(12) United States Patent
Kotera et al.

(10) Patent No.: US 6,492,028 B2
(45) Date of Patent: Dec. 10, 2002

(54) ADHESIVE FOR GLASS

(75) Inventors: Seigo Kotera, Yokohama (JP); Takashi Shibuya, Yokohama (JP); Yoshitaka Matsuyama, Yokohama (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 09/738,767

(22) Filed: Dec. 18, 2000

(65) Prior Publication Data

US 2001/0000789 A1 May 3, 2001

Related U.S. Application Data

(62) Division of application No. 09/341,138, filed as application No. PCT/JP98/00089 on Jan. 13, 1998, now abandoned.

(30) Foreign Application Priority Data

Jan. 14, 1997 (JP) ................................................. 9-4711
Jan. 14, 1997 (JP) ................................................. 9-4712

(51) Int. Cl.[7] .............................................. C03C 27/12
(52) U.S. Cl. .................. 428/424.8; 428/34; 428/425.6; 428/431; 428/435; 156/109; 156/331.1; 156/331.4; 156/331.7; 156/332; 525/131; 525/440; 528/75; 528/83; 528/85
(58) Field of Search .......................... 428/425.6, 424.8, 428/34, 431, 435; 156/109, 331.1, 331.4, 331.7, 332

(56) References Cited

U.S. PATENT DOCUMENTS

| 4,433,017 A | | 2/1984 | Goto ........................... 528/45 |
| 4,511,629 A | * | 4/1985 | Schumacher ............. 428/425.6 |
| 4,939,879 A | * | 7/1990 | Gold ........................... 52/208 |

FOREIGN PATENT DOCUMENTS

| EP | 0 433 069 | 6/1991 |
| EP | 0 478 176 | 4/1992 |
| EP | 0 811 656 | 12/1997 |
| JP | 52101240 | 8/1977 |
| JP | 56055475 | 5/1981 |
| JP | 56095969 | 8/1981 |
| JP | 61115976 | 6/1986 |

OTHER PUBLICATIONS

Patent Abstracts of Japan, vol. 006, No. 186 (C–126), Sep. 22, 1982, JP 57 100947, Jun. 23, 1982.

* cited by examiner

Primary Examiner—Patricia A. Short
(74) Attorney, Agent, or Firm—Oblon, Spivak, McClelland, Maier & Neustadt, P.C.

(57) ABSTRACT

The present invention provides the following adhesive which is good in durability in bonding a glass plate and a resin composition containing a butyl type rubber. The present invention provides the following adhesive which is particularly suitable as an adhesive for bonding a glass plate and a resin composition containing a butyl type rubber, for a double glazing employing a spacer comprising a resin composition containing a butyl type rubber.

Namely, the present invention is an adhesive for bonding inorganic glass and a resin composition containing a butyl type rubber, which comprises, as an effective component, at least one member selected from the group consisting of (A) a mixture of a terminal reactive oligomer having $C_4$ bivalent hydrocarbon groups as repeating units with a chain extender, (B) a reaction product of a terminal reactive oligomer having $C_4$ bivalent hydrocarbon groups as repeating units with a chain extender, (C) a mixture of a polyester polyol with a polyisocyanate and (D) a reaction product of a polyester polyol with a polyisocyanate.

26 Claims, 2 Drawing Sheets

ADHESIVE FOR GLASS

This application is a Division of application Ser. No. 09/341,138 filed on Jul. 14, 1999, now abandoned, which was originally filed as International App. No. PCT/JP98/00089, on Jan. 13, 1998.

BACKGROUND OF THE INVENTION

1. Technical Field

The present invention relates to an adhesive for bonding inorganic glass (hereinafter simply referred to as glass unless otherwise specified) and a resin composition containing a butyl type rubber, which is useful for vehicle and building components, particularly an adhesive to be used for production of a double glazing.

2. Background Art

A butyl rubber may be used for bonding glass and another building component or bonding glass and glass for fixation at periphery of window glass for vehicle or periphery of building materials. Further, a butyl rubber may be used for sealing for a gap between glass and another building component or a gap between glass and glass, which is required to have a low moisture permeability. The reason why a butyl rubber is used for such applications is that a butyl rubber has a high adhesion, a low moisture permeability and a high weather resistance.

However, the adhesion of a butyl rubber is likely to be lowered if e.g. moisture penetrates into an interface between a substrate and the butyl rubber. Further, with regard to a composition containing a butyl rubber and various compounding agents blended therewith, the adhesion of the butyl rubber greatly depends on the physical properties of the composition. If the hardness of the composition is made high, for example, the adhesion lowers, whereby good bonding with a substrate can not be secured. A butyl rubber alone or its composition having properties close thereto, has a low modulus of elasticity, whereby it is likely to creep. A composition having a relatively large amount of compound agent blended therewith, has a high modulus of elasticity, whereby it is less likely to creep. However, the adhesion lowers, whereby the bonding with the substrate is insufficient.

When a butyl rubber is used as an edge sealing material for a double glazing, as the hardness of the butyl rubber is low, a spacer made of a metal such as aluminum is usually used, and the butyl rubber is arranged between the spacer and glass as a sealing material. The butyl rubber has a function to seal the interface between a glass plate and the spacer, to secure airtightness.

FIG. 3 is a cross sectional view illustrating the edge of the above-mentioned conventional double glazing 1. Two glass plates 1a and 1b are faced each other with a metal spacer 2 containing a drying agent 6 interposed therebetween to form a hollow layer 7, which is isolated from the open air by a primary sealing materials 3 made of a butyl type interposed between the metal spacer 2 and the glass plates 1a and 1b. The gap (concave portion) 8 constituted by outer surface of the spacer and inner surface of the periphery of the glass plates facing each other, is sealed by a secondary sealing material 5 made of a cold-setting sealing material represented by a polysulfide type or a silicone type.

A conventional double glazing employs a metal spacer, whereby the production steps of the double glazing are complicated, and it is desired to develop a double glazing having a structure with which the production steps can be more simplified. Heretofore, it has been studied and proposed to employ the folding system of the aluminum spacer for simplification or automatization of the production steps of a double glazing, or to improve the productivity by e.g. automatizing the coating of the cold-setting sealing material for reducing cost.

However, the double glazing using such a cold-setting sealing material requires a long period of time for curing the sealing material after the production of the double glazing, regardless of the type of the spacer to be used. Accordingly, the products can not be forwarded until the completion of the curing. Therefore, it is required to provide a space for curing in a plant, and to store the products for a certain period of time before forwarding, whereby it tends to take long for/delivery, and the demands of the clients can not always be met. Further, to deal with the demands which will increase in future, more space for curing is required. To avoid this, and to secure an adequate supply of the double glazing, it is considered to be necessary to reduce the above-mentioned time for curing.

In view of reducing cost for producing the double glazing, it has been proposed to use a molded product comprising a partially-vulcanized butyl rubber composition having a drying agent incorporated therein, as a spacer (JP-B-61-20501). However, the hardness of the spacer comprising the butyl rubber-containing resin composition is not sufficient, whereby it is difficult to keep the shape of the double glazing with the spacer alone. To overcome the problem, it is considered to make the hardness of the resin composition high by blending a large amount of filler. However, in the case where the hardness is made high, the stress on the interface between glass and the spacer increases, whereby durable bonding property is not sufficient only with the adhesion of the butyl rubber.

In order to improve the physical properties of a butyl type rubber having a high adhesion by itself, the use of which is not limited to a double glazing, various compounding agents may be blended therewith, and when the composition thus obtained is bonded to glass, bonding property may sometimes be insufficient. In such a case, it is desired to employ a means of improving the bonding property, particularly the durable bonding property, of the composition to glass. The means of improving the bonding property of the resin composition containing a butyl type rubber to glass has not adequately been studied.

DISCLOSURE OF THE INVENTION

The present invention provides the following invention.

An adhesive for bonding inorganic glass and a resin composition containing a butyl type rubber, which comprises, as an effective component, at least one member selected from the group consisting of (A) a mixture of a terminal reactive oligomer having $C_4$ bivalent hydrocarbon groups as repeating units with a chain extender, (B) a reaction product of a terminal reactive oligomer having $C_4$ bivalent hydrocarbon groups as repeating units with a chain extender, (C) a mixture of a polyester polyol with a polyisocyanate and (D) a reaction product of a polyester polyol with a polyisocyanate.

BEST MODE FOR CARRYING OUT THE INVENTION

Figure 1:
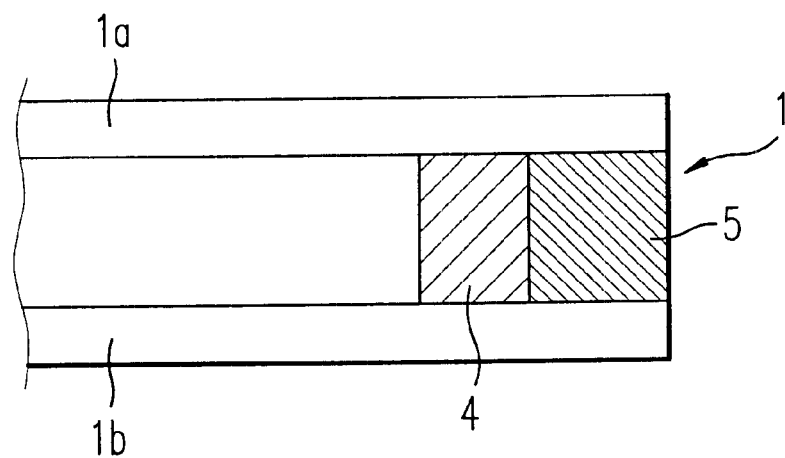
FIG. 1 is a partial cross sectional view illustrating one example for a constitution of a double glazing.

The present inventors have studies to overcome the problems in bonding property by bonding inorganic glass and a resin composition containing a butyl type rubber by using an adhesive. A resin composition containing a butyl type rubber has a low water permeability and a high weather resistance, and it is thereby particularly suitable for a spacer for a double glazing.

As a result of studies, the present inventors have found an adhesive suitable for the purpose. The present invention will be explained hereinafter.

Terminal Reactive Oligomer

The terminal reactive oligomer having $C_4$ bivalent hydrocarbon groups as repeating units of the present invention is an oligomer having repeating units derived from a $C_4$ hydrocarbon monomer, and is a compound having reactive functional groups such as hydroxyl groups, carboxyl groups, amino groups, mercapto groups, epoxy groups and isocyanate groups, at the terminals of the oligomer. It is a compound to be a high molecular polymer which functions as an adhesive by reacting it with a chain extender having functional groups reactive to such functional groups, for chain extension or for crosslinking.

Although the lower limit of the molecular weight of the terminal reactive oligomer is not particularly limited, it is usually 300. Although the upper limit is not particularly limited, it is about 100,000. The molecular weight is preferably from 500 to 10,000, particularly preferably from 800 to 5,000. It is preferred that the terminal reactive oligomer is substantially a linear oligomer. Further, an oligomer having a relatively low molecular weight may be a branched oligomer, or it may be a branched tri- or higher functional oligomer having a functional group at each terminal.

The $C_4$ bivalent hydrocarbon group as a repeating unit is preferably one having no unsaturated group as a repeating unit. Such a saturated hydrocarbon group may, for example, be an ethylethylene group [—$CH_2$—$CH(CH_2CH_3)$—], a 1,2-dimethylethylene group [—$CH(CH_3)$—$CH(CH_3)$—], a 1,1-dimethylethylene group [—$C(CH_3)_2$—$CH_2$—] or a tetramethylene group [—$(CH_2)_4$—]. They are polymerized units of 1-butene, 2-butene and isobutylene, and units formed by addition of hydrogen to the polymerized unit of butadiene (the ethylethylene group and the tetramethylene group), respectively.

The terminal reactive oligomer is an oligomer formed from at least one member of such repeating units. Further, a relatively small amount of other repeating units may be contained therein in addition to such repeating units. Other repeating units may, for example, be polymerized units of a diene having a carbon number of at least 5 such as isoprene, pentadiene or dicyclopentadiene, polymerized units of a halogen-containing diene such as chloroprene, or polymerized units of an olefin such as ethylene, propylene or styrene. The proportion of the other repeating units in the terminal reactive oligomer is suitably at most 20 mol % to the total repeating units. The other repeating units may contain unsaturated groups. Further, a small amount of $C_4$ hydrocarbon groups having unsaturated groups may be contained therein.

The preferred terminal reactive oligomer in the present invention may be a homopolymer of 1-butene, a homopolymer of isobutylene, a copolymer of 1-butene and isobutylene, a hydride of a homopolymer of butadiene (such as 1,2-polybutadiene or 1,4-polybutadiene), or a copolymer of at least one monomer having a carbon number of 4 such as 1-butene, isobutylene or butadiene with e.g. isoprene, pentadiene or styrene, or a hydride thereof. The most preferred terminal reactive oligomer is a hydride of a homopolymer of butadiene and a homopolymer of isobutylene.

The functional group in the terminal reactive oligomer may, for example, be a hydroxyl group, a carboxyl group, an amino group, a mercapto group, an epoxy group or an isocyanate group. A hydroxyl group or a carboxyl group is preferred, and a hydroxyl group is particularly preferred.

Chain Extender

As the chain extender, a compound having at least two functional groups reactive to the functional groups of the above-mentioned terminal reactive oligomer, may be used.

For example, a hydroxyl group-terminated oligomer may be reacted with a chain extender of a polyisocyanate to produce a polyurethane, or it may be reacted with a chain extender of a polycarboxylic acid, or an acid chloride or an alkyl ester thereof to produce a polyester. Similarly, a carboxyl group-terminated oligomer may be reacted with a chain extender of a polyol, a polyamine or a polyepoxide, and an amino group-terminated oligomer may be reacted with a chain extender of a polyepoxide, a polycarboxylic acid or an anhydride thereof.

The particularly preferred combination of a terminal reactive oligomer and a chain extender in the present invention, is a combination of a hydroxyl group-terminated oligomer and a chain extender of a polyisocyanate, a polycarboxylic acid or a reactive acid derivative of a polycarboxylic acid.

Polyisocyanate

The polyisocyanate to be used as a chain extender in the present invention is an organic compound having an average of at least two isocyanate groups in a molecule. The polyisocyanate may, for example, be a monomeric polyisocyanate, a polymer thereof, a modified product thereof or an isocyanate-terminated prepolymer, and at least one of them may be used in the present invention. The monomeric polyisocyanate includes the following polyisocyanates.

An aromatic polyisocyanate such as 2,4-tolylene diisocyanate, 2,6-tolylene diisocyanate, p-phenylene diisocyanate, 4,4'-diphenylmethane diisocyanate, tolidine diisocyanate, 1,5-naphthalene diisocyanate, triphenylmethane triisocyanate, tris(isocyanatephenyl)thiophosphate, xylene diisocyanate or tetramethylxylene diisocyanate; an aliphatic polyisocyanate such as ethylene diisocyanate, propylene diisocyanate, tetramethylene diisocyanate, hexamethylene diisocyanate, lysine diisocyanate, lysine ester diisocyanate, trimethylhexamethylene diisocyanate, 1,3,6-hexamethylenetriisocyanate or 1,6,11-undecane triisocyanate; or an alicyclic polyisocyanate such as isophorone diisocyanate, trans-cyclohexane diisocyanate, 1,3-bis (isocyanatemethyl)cyclohexane, dicyclohexylmethane-1,4-diisocyanate, 1-methyl-2,5-diisocyanatecyclohexane or 1-methyl-2,6-diisocyanatecyclohexane.

As the polymer, the modified product or the isocyanate-terminated prepolymer of the above-mentioned monomeric polyisocyanate, a urethane modified product or an isocyanate-terminated urethane prepolymer, a dimer or a trimer, a carbodiimide modified product, a urea modified product or a biuret modified product, obtainable by a reaction with a polyol, may, for example, be mentioned. A urethane modified product modified by trimethylolpropane, or an isocyanurate compound which is a trimer, is particularly preferred. Further, a blocked polyisocyanate obtainable by blocking isocyanate groups by a blocking agent, may be used, as the case requires.

To obtain an initial bonding in a shorter period of time, an aromatic polyisocyanate (it may be a non-yellowing aromatic polyisocyanate such as xylene diisocyanate) is preferred, and to improve compatibility with a butyl type rubber-containing resin composition and to improve the bonding property, an aliphatic or an alicyclic polyisocyanate is preferred.

Polycarboxylic Acid or Reactive Acid Derivative Thereof

As a polycarboxylic acid or a reactive acid derivative thereof to be used as a chain extender in the present invention, a dicarboxylic acid or a reactive acid derivative thereof is preferred, and as the case requires, a small amount of a tri- or higher functional polycarboxylic acid or a reactive derivative thereof may be used together.

As the dicarboxylic acid, an aliphatic dicarboxylic acid, an alicyclic dicarboxylic acid or an aromatic dicarboxylic acid may, for example, be mentioned. Two or more kinds of them may be used. An aliphatic dicarboxylic acid is particularly preferred.

As the reactive acid derivative of a dicarboxylic acid, an acid chloride, a lower alkyl ester such as methyl ester, or an acid anhydride is preferred, and an acid chloride is particularly preferred.

The molecular weight of such a dicarboxylic acid or a reactive acid derivative thereof is not particularly limited. However, it is preferably at most 300.

Specific examples of the dicarboxylic acid include the following compounds: aliphatic dicarboxylic acids such as adipic acid, pimelic acid, suberic acid, azelaic acid, sebacic acid, malonic acid, succinic acid and glutaric acid; alicyclic dicarboxylic acids such as cyclohexanedicarboxylic acid; and aromatic dicarboxylic acids such as terephthalic acid, isophthalic acid, phthalic acid, toluenedicarboxylic acid and naphthalenedicarboxylic acid.

Adhesive Comprising a Combination of a Hydroxyl Group-terminated Oligomer and a Polyisocyanate As a combination of a hydroxyl group-terminated oligomer and a polyisocyanate, a mixture of them, or a prepolymer or a polyurethane polymer, which is a reaction product of them, functions as an adhesive. As the prepolymer, a hydroxyl group-terminated prepolymer or an isocyanate group-terminated prepolymer may be mentioned, and an isocyanate group-terminated prepolymer is particularly preferred.

In the case of using a polyurethane polymer as an adhesive, a diisocyanate is preferred as the polyisocyanate. In the case of using a mixture or a prepolymer of a hydroxyl group-terminated oligomer and a polyisocyanate, it is preferred to use a diisocyanate, a tri- or higher functional polyisocyanate or both of them.

The amount of the polyisocyanate is not particularly limited. However, in view of imparting hardness, it is preferred to use the polyisocyanate in such a proportion that the isocyanate group is from 0.6 to 10 equivalent, particularly from 0.8 to 5 equivalent, to the functional groups reactive to the isocyanate group (such as a hydroxyl group) in the terminal reactive oligomer. Further, the polyisocyanate can be used as a crosslinking agent for a polymer, whereby a larger amount of polyisocyanate can be used in the production stage of a polymer or a prepolymer. In such a case, a polyisocyanate can be used in such a proportion that the isocyanate group is from 1 to 60 equivalent, particularly from 5 to 30 equivalent, to the functional groups in the oligomer.

Such an adhesive may be dissolved in a solvent. Further, a polyurethane polymer having a relatively low melting point can be used as a so-called hot-melt adhesive. Further, the isocyanate group-terminated prepolymer may be mixed with a chain extender such as a polyol, and the hydroxyl group-terminated prepolymer may be mixed with a chain extender such as a polyisocyanate. A polyurethane polymer may further be mixed with a chain extender such as a polyisocyanate (it is usually called as a crosslinking agent in such a case) to use as an adhesive.

In a case where a polymer or a prepolymer is produced, and then a polyisocyanate is blended therewith, the amount of the polyisocyanate is preferably from about 1 to about 50 parts by weight based on 100 parts by weight of the polymer or the prepolymer.

Adhesive Comprising a Combination of a Hydroxyl Group-terminated OliGomer and a Polycarboxylic Acid or a Reactive Acid Derivative Thereof With regard to a combination of a hydroxyl group-terminated oligomer and a polycarboxylic acid or a reactive acid derivative thereof, a mixture of them and a polyester which is a reaction product of them, may function as an adhesive.

In a case of using a combination of a hydroxyl group-terminated oligomer and a polycarboxylic acid or a reactive acid derivative thereof, usually they are preliminarily reacted to produce a polymer, which is then used as an adhesive. The polymer is considered to be one kind of polyesters, and the polyester may contain hydroxyl groups or carboxyl groups at the terminals. The polyester can be obtained by reacting almost same equivalent of the hydroxyl group-terminated oligomer and the polycarboxylic acid or the reactive acid derivative thereof.

The molecular weight is preferably at least 2 times, particularly preferably at least 5 times as high as the molecular weight of the hydroxyl group-terminated oligomer. Further, the obtained polyester is preferably a solid polyester at room temperature, and one which may be melted by heating. Such an adhesive may be dissolved in a solvent. Further, such an adhesive may be used as a so-called hot-melt adhesive. The polyester may be mixed with a crosslinking agent such as a polyisocyanate. In such a case, it is preferred to use from about 1 to about 50 parts by weight of the polyisocyanate based on 100 parts by weight of the polyester.

Polyester Polyol

The polyester polyol in the present invention is a polyester having hydroxyl groups at the terminals, obtainable by condensation polymerization of a polycarboxylic acid or a reactive acid derivative thereof with a polyol, a condensation polymerization of an oxy acid, a ring opening polymerization of a cyclic ester or the like. A polyester polyol obtainable by condensation polymerization of a polycarboxylic acid or a reactive acid derivative thereof with a polyol is particularly preferred. Although the polyester polyol may be a polymer having a small number of branches, it is preferably a linear polymer. Namely, a polyester polyol obtainable from a dicarboxylic acid or a reactive acid derivative thereof and a diol is preferred.

The lower limit of the molecular weight is not particularly limited. However, it is preferably 1000, particularly preferably about 5,000. The upper limit of the molecular weight is not particularly limited so long as the polymer may be melted under heating. However, it is preferably about 100,000, particularly preferably about 50,000. Further, in view of easiness in handling as an adhesive for producing a double glazing, a solid polyester polyol at room temperature is preferred. Namely, a solid polyester polyol to be used as a so-called hot-melt adhesive, is preferred.

With regard to the solid polyester polyol at room temperature, it is preferred that at least some of polycarboxylic acid residues (groups having hydroxyl groups in the carboxylic groups in the polycarboxylic acids removed therefrom) as one of constituting units for the polyester, are residues of an aromatic polycarboxylic acid, particularly residues of an aromatic dicarboxylic acid. It is particularly preferred that from 60 to 100 mol % of the total polycarboxylic acid residues are aromatic dicarboxylic acid residues. Some of polycarboxylic acid residues may be residues of a tri- or higher functional polycarboxylic acid such as tricarboxylic acid.

As the aromatic dicarboxylic acid, terephthalic acid, isophthalic acid, phthalic acid, toluenedicarboxylic acid or naphthalenedicarboxylic acid may, for example, be mentioned, and terephthalic acid or isophthalic acid is particularly preferred. Further, as a polycarboxylic acid other than the aromatic polycarboxylic acid, an aliphatic dicarboxylic acid such as adipic acid, suberic acid or sebacic acid or an alicyclic dicarboxylic acid such as cyclohexanedicarboxylic acid may, for example, be mentioned. The molecular weight of such a polycarboxylic acid is not particularly limited. However, it is suitably less than 300, particularly suitably at most 250.

As the reactive acid derivative of the polycarboxylic acid, an acid chloride, a lower alkyl ester such as methyl ester, or an acid anhydride is preferred, and an acid chloride is particularly preferred. Such a polycarboxylic acid or a reactive acid derivative thereof may be used in combination as a mixture of two or more of them.

As polyol residues (groups having hydrogen atoms in hydroxyl groups in the polyol removed therefrom) as other constituting units for the polyester polyol, residues derived from an aliphatic diol are preferred. Further, residues derived from an aromatic diol or from an alicyclic diol together may be contained therein. Further, some of polyol residues may be polyol residues of a tri- or higher functional polyol such as triol. The molecular weight of such a polyol is not particularly limited. However, it is suitably less than 300, particularly suitably at most 200.

As the diol, ethylene glycol, diethylene glycol, propylene glycol, dipropylene glycol, 1,4-butanediol, 1,6-hexanediol, neopentyl glycol or cyclohexanedimethanol may, for example, be mentioned. Neopentyl glycol and 1,4-butanediol are particularly preferred.

Adhesive Comprising a Combination of a Polyester Polyol and a Polyisocyanate

In a case of using a polyester polyol and a polyisocyanate as combined, a mixture of a polyester polyol with a polyisocyanate, a prepolymer or a polyurethane polymer, which is a reaction product of them, may function as an adhesive.

As the polyisocyanate, the above-mentioned polyisocyanate to be used as a chain extender, may be used. It is preferred to use a diisocyanate, a tri- or higher functional polyisocyanate functional groups or both of them.

In such a case, the amount of the polyisocyanate is not particularly limited. However, it is usually at least the same equivalent to the polyester polyol, and it is preferably an excess equivalent in view of imparting hardness. Namely, it is preferred to use the polyisocyanate in a proportion of from 1 to 60 equivalent, particularly from 5 to 30 equivalent, to the hydroxyl groups of the polyester polyol. Further, the polyisocyanate can be used in a weight ratio of at most about 50 parts by weight based on 100 parts by weight of a polyester polyol.

Such an adhesive may be dissolved in a solvent. Further, a polymer having a relatively low melting point can be used as a so-called hot-melt adhesive. Further, an isocyanate group-terminated prepolymer may be mixed with a chain extender such as a polyol, and a hydroxyl group-terminated prepolymer may be mixed with a chain extender such as a polyisocyanate. Further, a polyurethane polymer may further be mixed with a chain extender such as a polyisocyanate (it is usually called as a crosslinking agent in such a case) to use as an adhesive.

Adhesive

In a case of using the above-mentioned mixture of a terminal reactive oligomer with a chain extender or the mixture of a polyester polyol with a polyisocyanate as an adhesive of the present invention, usually they are mixed, and before they are adequately reacted, the mixture is applied to the adherend part of inorganic glass or a butyl type rubber-containing resin composition by e.g. coating, and both adherend materials are contacted with each other to be bonded. In a case of using the prepolymer, it may be used in such a manner, or the prepolymer and the chain extender are used as a mixture. In a case of using the polymer, it is usually applied to the adherend part in the same manner as the hot-melt adhesive. When such an adhesive is used, it is preferred to dissolve the adhesive in an inert solvent. In such a case, the solution is coated on the adherend part, the solvent is removed therefrom, and then the adherend materials are contacted with each other to be bonded.

With the adhesive of the present invention, a compounding agent such as a solvent, a catalyst, a pigment, a filler, an anti-oxidant, a heat stabilizer or an anti-aging agent may be blended, as the case requires. As mentioned above, a solvent is usually used. Further, in view of improving the bonding property, it is particularly preferred to blend a silane coupling agent therewith. The amount of the silane coupling agent is suitably from 0.05 to 15 parts by weight, particularly preferably from 1 to 10 parts by weight, based on 100 parts by weight, of components which function as an adhesive.

The amount of components which function as an adhesive, is a total amount of the terminal reactive oligomer, the chain extender and their reaction product, or the total amount of polyester polyol, the polyisocyanate and their reaction products.

Silane Coupling Agent

In the present invention, the above-mentioned adhesive may contain a silane coupling agent. The silane coupling agent is a silane compound having hydrolizable groups and organic groups with functional groups bonded to a silicon atom, and a partially hydrolyzed product and a partially hydrolyzed condensation product thereof. As the hydrolizable group, a residue having hydrogen atoms in hydroxyl groups removed from a hydroxyl group-containing compound such as an alkoxy group, an acyloxy group, a halogen atom such as a chlorine atom, a ketoximate group, an amino group, an aminoxy group, an amido group or an isocyanate group may, for example, be mentioned. As the hydrolizable group, an alkoxy group having a carbon number of at most 4 is particularly preferred. It is preferred that one silicon atom has from 1 to 3, particularly from 2 to 3, hydrolizable groups bonded thereto.

It is preferred that a silicon atom having hydrolizable groups bonded thereto, has from 1 to 3, preferably from 1 to 2, organic groups (non-hydrolizable organic groups of carbon atoms bonded to a silicon atom) bonded thereto. Among such organic groups, at least one, preferably only one, is an organic group having functional groups.

Another organic group is an organic group having no functional groups such as an alkyl group, and the organic group is preferably an alkyl group having a carbon number of at most 4 such as a methyl group. Such an organic group is usually a monovalent organic group. However, it may be a polyvalent organic group such as a bivalent organic group connecting two silicon atoms. Further, the polyvalent organic group may be an organic group having functional groups. Now, a silane coupling agent having monovalent organic groups containing functional groups, will be further explained.

As the functional group in the organic group having functional groups, an epoxy group, an amino group, a mercapto group, an unsaturated group, a chlorine atom or a carboxyl group may, for example, be mentioned, and an epoxy group, an amino group and a mercapto group are preferred. Specifically, it may, for example, be a 3-glycidoxypropyl group, a 2-(3,4-epoxycyclohexyl)ethyl group, a 3-aminopropyl group, an N-(2-aminoethyl)-3-aminopropyl group, a 3-(N-phenylamino)propyl group, a 3-mercaptopropyl group, a vinyl group, a 3-methacryloyloxypropyl group, a 3-(2-butenoyl)propyl group or a 2-(4-vinylphenyl)ethyl group.

As the preferred silane coupling agent in the present invention, the following silane coupling agents may, for example, be mentioned.

3-glycidoxypropyltrimethoxysilane, bis(3-glycidoxypropyl)dimethoxysilane, 2-(3,4-epoxycyclohexyl)ethyltrimethoxysilane, 3-aminopropyltriethoxysilane, N-(2-aminoethyl)-3-aminopropyldimethoxymethylsilane, N-(2-aminoethyl)-3-aminopropyltrimethoxysilane, 3-(N-phenylamino)propyltrimethoxysilane, 3-(N-allylamino)propyltrimethoxysilane, 3-mercaptopropyltrimethoxysilane, 3-mercaptopropyltriethoxysilane, vinyltriethoxysilane, vinyltris(2-methoxyethoxy)silane, 3-methacryloyloxypropyltrimethoxysilane and 3-chloropropyltrimethoxysilane.

Glass

The glass in the present invention means e.g. a glass plate, a tempered glass plate, a laminated glass plate, a metal-wired glass plate, a heat-absorbing glass plate, and a glass plate having a metal or other inorganic matter coated on the inside, such as a heat reflecting glass plate and a low reflecting glass plate, which are widely used for windows in buildings or windows in vehicles. The double glazing is an assembly having the above-mentioned structure wherein at least two of such glass plates are combined to form a hollow layer therein. One of the two plates forming a hollow layer of the double glazing, is not necessarily inorganic glass, and it may be organic glass such as acrylic resin or polycarbonate resin.

Resin Composition Containing a Butyl Type Rubber

The resin composition containing a butyl type rubber in the present invention is a resin composition having various compounding agents blended with a butyl type rubber to improve physical properties of the butyl type rubber. Particularly, a metal spacer is not used in the present invention, and thus the resin composition containing a butyl type rubber is preferably applied to a butyl type rubber-containing resin composition to be used for a double glazing having a structure in which the butyl type rubber-containing resin composition itself functions as a spacer. Such a butyl type rubber-containing resin composition is a butyl type rubber-containing resin composition having a drying agent or a filler blended in a butyl type rubber, and having a relatively high hardness as compared with a butyl type rubber alone. The more preferred butyl type rubber-containing resin composition is a butyl type rubber-containing resin composition having a high hardness, to be used for a double glazing having such a structure that a secondary sealing material is not required substantially.

Figure 2:
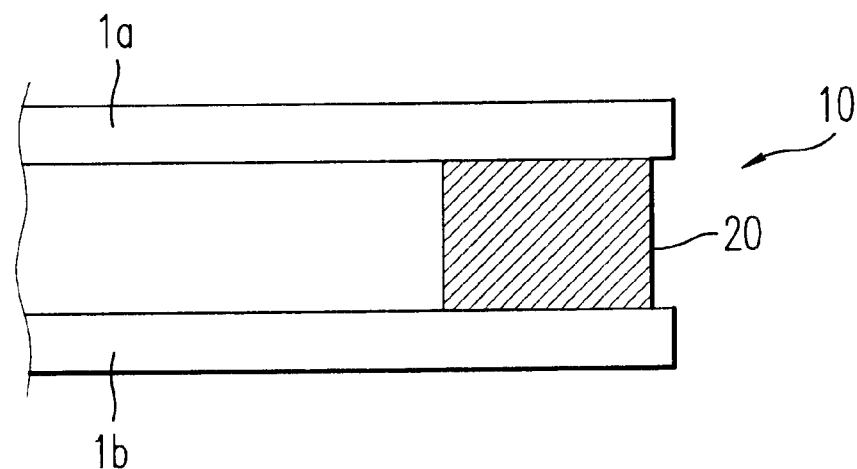
FIG. 2 is a partial cross sectional view illustrating another example for a constitution of a double glazing.
Figure 3:
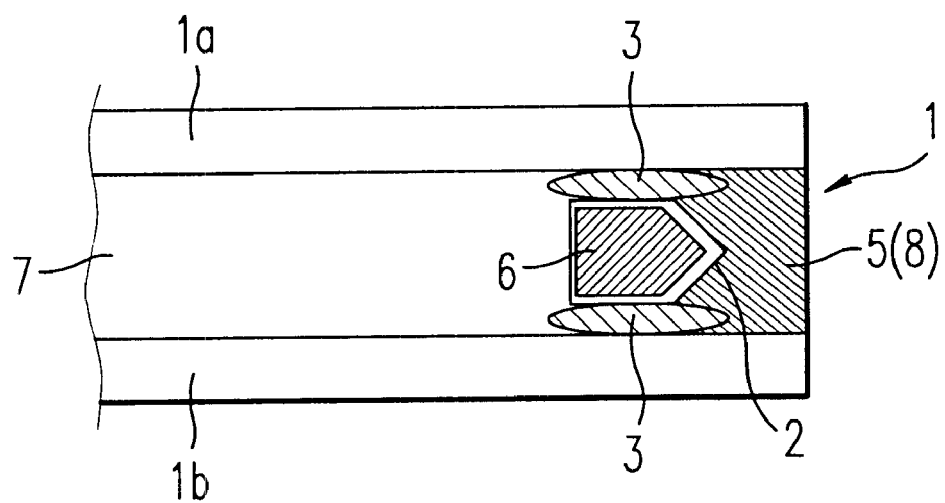
FIG. 3 is a partial cross sectional view illustrating a constitution of a conventional double glazing.

FIG. 1 and FIG. 2 are cross sectional views illustrating the edge of the above-mentioned double glazing. FIG. 1 illustrates a double glazing 1 having a structure in which a secondary sealing material is used, and having a structure in which two glass plates 1 and 1b are sealed with a resin spacer 4 comprising a butyl type rubber-containing resin composition and a secondary sealing material 5 comprising a cold-setting sealing material. FIG. 2 illustrates a double glazing 10 having a structure in which a secondary sealing material is not used, and having a structure in which two glass plates 1a and 1b are sealed only with a spacer 20 comprising a butyl type resin-containing resin composition. The adhesive of the present invention is most suitable as an adhesive to bond the glass plates 1a and 1b and the spacer comprising a butyl type rubber-containing resin composition in the double glazing 1 and 10 having such a structure.

The above-mentioned spacer comprising a butyl type rubber-containing resin composition having a high hardness, has an adhesion to glass at a high temperature. However, the strength of the spacer itself is increased, and thus when tensile stress is applied thereto, the stress is likely to concentrate on the glass interface, whereby the separation is likely to result. Accordingly, an adhesive is considered to be necessary. During the production of the double glazing, glass and the spacer are bonded in such a manner that an adhesive is coated on washed glass followed by drying to form an adhesive layer on glass, and the spacer is molded at a high temperature and immediately bonded to the adhesive layer on the glass surface; or the spacer is arranged on the adhesive layer on the glass surface followed by press at a high temperature. In such cases, if the adhesion of the adhesive after coated is high, the conveyance of the glass having the adhesive coated thereon tends to be difficult, and if the bonding property can not be obtained immediately after the molding, the handling of the double glazing tends to be difficult. Accordingly, in order to avoid such limitations, it is preferred to use a hot-melt adhesive among the above-mentioned adhesives of the present invention.

The butyl type rubber in the butyl type rubber-containing resin composition of the present invention, means a homopolymer of isobutylene, a copolymer of isobutylene with another monomer, and a modified product of them. The homopolymer may be a homopolymer having a relatively high molecular weight and a homopolymer having a relatively low molecular weight. The former has a molecular weight of usually at least 30,000, and representative one (such as a commercial product) has a molecular weight of from 50,000 to 150,000. The latter has a molecular weight of usually less than 30,000, and the representative one (such as a commercial product) has a molecular weight of from 10,000 to 15,000. Here, the molecular weight means viscosity-average molecular weight (Staudinger molecular weight). In the case of using a homopolymer of isobutylene as a butyl type rubber in the present invention, a homopolymer having a relatively high molecular weight is used. A homopolymer having a relatively low molecular weight may be used together with another butyl type rubber, and it is usually used as an additive for the purpose of imparting adhesion or plasticizing (making the viscosity low). A polyisobutylene in Examples means such isobutylene homopolymers.

The copolymer is a polymer obtainable by copolymerizing isobutylene with at least one kind of a copolymerizable monomer in a relatively small amount. The copolymerizable monomer may, for example, be isoprene, 1-butene, divinylbenzene or p-methylstyrene. As the copolymer, a copolymer obtainable by copolymerization with isoprene (which is usually called as a butyl rubber) is particularly preferred. The modified product may, for example, be a halogenated butyl rubber such as a chloride or a bromide of a butyl rubber, or a partially vulcanized butyl rubber obtainable by partial vulcanization of a butyl rubber. The particularly preferred butyl type rubber of the present invention is an isobutylene homopolymer having a relatively high molecular weight, a copolymer of isobutylene with isoprene which is usually called as a butyl rubber, or a partially vulcanized butyl rubber.

As the butyl type rubber-containing resin composition having a high hardness, a composition having a butyl type rubber and crystalline polyolefin blended therewith, is preferred. The crystalline polyolefin is a homopolymer of an olefin such as ethylene or propylene, a copolymer with another monomer, or a modified product of them, which has crystallinity. The structure of the polymer is preferably a syndiotactic structure or an isotactic structure. However, another structure may be contained therein. As the olefin, ethylene and propylene are particularly preferred. The copolymer may be a copolymer of at least two kinds of olefin or a copolymer of olefin with another monomer, and it is suitably a copolymer of ethylene or propylene with another monomer which does not inhibit crystallinity. As the copolymer, a block copolymer is more suitable than an alternate copolymer or a random copolymer. The modified product may be a crystalline polyolefin having functional groups such as acid anhydride groups, carboxyl groups or epoxy groups introduced therein.

The particularly preferred crystalline polyolefins are a polyethylene and a polypropylene which are substantial homopolymers. As a polyethylene, a low-density polyethylene, a medium-density polyethylene or a high-density polyethylene may, for example, be used. The crystallinity of the crystalline polyolefin is preferably at lest 30%, particularly preferably at lest 50%. For example, the representative values of crystallinity of the usual crystalline polyolefin are 50–60% with a low-density polyethylene, 75–90% with a high-density polyethylene, and 55–65% with a polypropylene. The molecular weight is not particularly limited. However, the number average molecular weight is suitably from about 200,000 to about 800,000 with a polyethylene, and from about 100,000 to about 400,000 with a polypropylene.

As mentioned above, the polyethylene and the polypropylene have a high crystallinity, and thus they have a lower permeability than a butyl type rubber. When one having a particularly low melt viscosity may be blended with the butyl type rubber, the melt viscosity of the composition will decrease, whereby the molding-processability will be increased, as compared with a case of the butyl type rubber alone. Accordingly, it becomes possible to blend various inorganic fillers therewith, whereby a butyl type rubber-containing resin composition having a high hardness can be realized. Further, in view of economy, it is particularly preferred to blend them therewith.

The proportion of the crystalline polyolefin to the total of the butyl type rubber and the crystalline polyolefin in the butyl type rubber-containing resin composition of the present invention, is preferably from 2 to 50 wt %, and particularly preferably from 5 to 40 wt %. If the proportion of the crystalline polyolefin is less than 2 wt %, it tends to be difficult to make the hardness of the butyl type rubber high, and if it exceeds 50 wt %, the property of the crystalline polyolefin will mainly be obtained, and the property of the butyl type rubber can hardly be obtained.

When an inorganic filler is blended therewith, the proportion of the crystalline polyolefin to the total of the butyl type rubber and the crystalline polyolefin can be made small. For example, when at least about 50 parts by weight of an inorganic filler may be blended therewith based on 100 parts by weight in total of the butyl type rubber and the crystalline polyolefin, the proportion of the crystalline polyolefin to the total of the butyl type rubber and the crystalline polyolefin can be from 2 to 20 wt % to adequately obtain the aimed effect.

With the butyl type rubber-containing resin composition containing a butyl type rubber and a crystalline polyolefin, a substantially effective amount of an inorganic filler may be blended. "Substantially effective amount" means at least 1 part by weight based on 100 parts by weight in total of the butyl type rubber and the crystalline polyolefin. If too large amount of an inorganic filler may be blended therewith, the melt viscosity of the composition tends to increase, and the tensile strength and the tear strength tend to decrease. Accordingly, the upper limit of the amount of the inorganic filler is 200 parts by weight, and preferably 150 parts by weight. When the inorganic filler is blended therewith, the preferred lower limit of its amount is 10 parts by weight.

As the inorganic filler, one which is usually used as an organic filler such as calcium carbonate, talc, mica or carbon black may be used alone or in combination as a mixture of two or more of them.

It is highly effective that the butyl type rubber and the crystalline polyolefin, contained in the butyl type rubber-containing resin composition of the present invention, are mixed under high temperature at latest before the butyl type rubber-containing resin composition is used for the final applications. 'The high temperature' during mixing means the temperature of at lowest the crystalline melting point of the crystalline polyolefin. The mixing temperature is required to be at highest the decomposition point of the butyl type rubber, and preferably it is at highest about 300° C. which is the decomposition point of the usual butyl type rubber. Particularly in view of productivity, it is preferably at highest 200° C. Accordingly, the crystalline melting point of the crystalline polyolefin is also preferably at highest 200° C.

It is more preferred that the change in hardness of the butyl type rubber-containing resin composition is as small as possible within the temperature range at which it is used. To satisfy such requirements, as the crystalline polyolefin, one having a crystalline melting point of at lowest the usual upper limit temperature at which the crystalline polyolefin is used. The usual upper limit temperature at which the double glazing is used, is about 80° C.

In the above-mentioned butyl type rubber-containing resin composition, the crystalline polyolefin is constrained by the cohesive force due to the crystalline phase, whereby the sudden drop in hardness or the fluid state, which can be seen in the non-crystalline resin, does not take place at a temperature of at highest the crystalline melting point, even at a temperature range of exceeding the glass transition temperature. On the contrary, the melt viscosity significantly decreases when the temperature exceeds the crystalline melting point, whereby the effect to make the miscibility with the butyl type rubber good, can be expected.

An additive which can usually be blended in e.g. a sealing material, may further be blended with the butyl type rubber-containing resin composition. Such an additive may, for example, be a drying agent, a lubricant, a pigment, an antistatic agent, a tackifier, a plasticizer, an anti-aging agent, a heat stabilizer, an anti-oxidant, a hydrolizable silyl group-containing compound such as the above-mentioned silane coupling agent, a blowing agent, or a filler other than the above-mentioned inorganic filler. It is particularly preferred to blend a drying agent such as zeolite, silica gel or alumina, a tackifier, a plasticizer, a silane coupling agent or a stabilizer therewith.

Among additives, it is particularly preferred to blend a drying agent such as zeolite in an amount of from 5 to 30 wt % with the butyl type rubber-containing resin composition. It is also preferred to blend the above-mentioned polyisobutylene having a relatively low molecular weight in an amount of at most 200 parts by weight, particularly from 5 to 150 parts by weight, based on 100 parts by weight of the butyl type rubber, as an additive to give the effect of imparting adhesion and the effect of plasticization.

As mentioned above, it is preferred that the butyl type rubber-containing resin composition is produced by mixing the butyl type rubber and the crystalline polyolefin at a temperature of from the crystalline melting point of the crystalline polyolefin to the decomposition point of the butyl type rubber. The mixing temperature is preferably from 100 to 280° C., particularly preferably from 120 to 250° C. The other compounding agents on additives may be mixed therewith at the time of mixing, or it may be mixed therewith before or after the mixing. Such a resin composition is a substantially thermoplastic resin composition, and may be mixed by a usual melt extruder or a mixing machine such as a kneader.

Since such an above-mentioned butyl type rubber-containing resin composition is a substantially thermoplastic resin composition, it is possible to conduct continuous molding with the above-mentioned mixing operation. Further, it is possible to produce a resin composition as a molding material in a form of e.g. pellets, and then to conduct molding. As a molding method, a melt molding such as extrusion molding or injection molding is employed. It is possible to produce a double glazing, continued from the molding operation, by arranging the molded product at the edge of the material of the double glazing having at least two glass plates arranged so that they face each other, and having an adhesive coated thereon. In such a case, by using a molded product having a high temperature obtained from the molding machine, a high bonding property between the molded product and the glass plate having an adhesive coated thereon, can be obtained. Further, it is possible to apply the molded product to the material of the double glazing, by suppressing the temperature drop of the molded product by using an apparatus such as an applicator. The apparatus is preferably one capable of heating.

With regard to physical properties of the butyl type rubber-containing resin composition to be used for the double glazing, the coefficient of water vapor permeation is preferably at most $4.0\times10^{-7}$ [cm$^3$·cm/(cm$^2$·sec·cmHg)], particularly preferably at most $7.0\times10^{-8}$ [cm$^3$·cm/(cm$^2$·sec·cmHg)], as defined in JIS K7149. Further, in view of shape-keeping property of the double glazing, JIS A hardness (HsA) at 25° C. is preferably at least 5, particularly preferably at lest 20. Further, if it is too hard, the stress on the sealing part or the glass plate of the double glazing tends to be high, whereby the upper limit of the hardness is preferably about 90. Usually, HsA of the butyl type rubber alone is substantially 0.

In the present invention, the butyl type rubber-containing resin composition is particularly excellent for sealing the edges of the double glazing. As mentioned above, the double glazing is preferably a double glazing having a structure in which a hard spacer such as a metal is not used, and the space between the glass plates is maintained by the hardness of the butyl type rubber-containing resin composition. The butyl type rubber-containing resin composition can be a resin composition having a suitable hardness by changing the amount of the crystalline polyolefin or the inorganic filler blended therewith. Accordingly, it is suitable as a spacer and sealing material for such a double glazing having a structure in which the metal spacer is not used. JIS A hardness (HsA) of the butyl type rubber-containing resin composition to be used for such an application is particularly preferably from 40 to 90 at 25° C.

EXAMPLES

Now, the present invention will be described further detail with reference to Examples. However, the present invention is by no means restricted to such specific Examples.

Example 1

Production of an Adhesive

To 50 g of a hydride of 1,2-polybutadiene (hydroxyl group-terminated, hydroxyl number: 50.8 mgKOH/g) under stirring and heating at 80° C., 4.78 g of isophorone diisocyanate was dropwise added quietly, followed by stirring and heating for 2 hours, which was then stirred and heated at 120° C. for 20 hours. The mixture was cooled, 200 g of a solvent having the same weight of toluene and methyl ethyl ketone (MEK) mixed, was added thereto for dissolution, and a solution having a solid concentration of about 20 wt % was obtained. Hereinafter the adhesive solution is referred to as "solution A".

Example 2

Production of an Adhesive 50 g of the same hydride of 1,2-polybutadiene as in Example 1 was dissolved in dehydrated tetrahydrofuran (THF), 3.94 g of dichloride adipate was added thereto, and the pressure was decreased to about 1 mmHg under stirring. The mixture was heated at from 65 to 70° C. and was stirred, and THF was evaporated to obtain a reaction product. 0.01 g of titan tetra-n-butoxide was added to the reaction product, and the reaction was conducted for 3 hours at 180° C. under reduced pressure of at most 1 mmHg. The mixture was cooled, 200 g of a solvent having the same weight of toluene and MEK mixed, was added thereto for dissolution and a solution having a solid concentration of about 20 wt % (hereinafter referred to as solution B) was obtained.

Example 3

Production of an Adhesive

To 50 g of a hydroxyl group-terminated polyisobutylene (hydroxyl number: 30.6 mgKOH/g) under stirring and heating at 80° C., 2.88 g of isophorone diisocyanate was dropwise added quietly, followed by stirring and heating for 2 hours, which was then stirred and heated at 120° C. for 20 hours. The mixture was cooled, 200 g of a solvent having the same weight of toluene and MEK mixed, was added thereto for dissolution, and a solution having a solid concentration of about 20 wt % (hereinafter referred to as solution C) was obtained.

Example 4

Production of an Adhesive 50 g of the same hydroxyl group-terminated polyisobutylene as in Example 3 was dissolved in dehydrated THF, 2.57 g of dichloride adipate was added thereto, and the pressure was reduced to about 1 mmHg under stirring. The mixture was stirred and heated at from 65 to 70° C. for 4 hours, and THF was evaporated to obtain a reaction product. 0.01 g of titan tetra-n-butoxide was added to the reaction product, and the reaction was conducted for 3 hours at 180° C. under reduced pressure of at most 1 mmHg. The mixture was cooled, 200 g of a solvent having the same weight of toluene and MEK mixed, was added thereto for dissolution, and a solution having a solid concentration of about 20 wt % (hereinafter referred to as solution D) was obtained.

Example 5

Production of an Adhesive 28.9 g of an ethyl acetate solution having 75 wt % of trimethylol propane-modified isophorone diisocyanate was heated to 80° C., 50 g of a MEK solution having 40 wt % of the same hydroxyl group-terminated 1,2-polybutadiene hydride as in Example 1 was dropwise added thereto, the temperature was raised to 120° C. under stirring under nitrogen atmosphere, and the reaction was conducted for 2 hours. The solvent was evaporated, the mixture was cooled, 48.9 g of a solvent having the same weight of toluene and MEK mixed was added thereto for dissolution, and a solution having a solid concentration of about 20 wt % (hereinafter referred to as solution E) was obtained.

Example 6

Production of an Polyester Polyol 5.07 g of terephthaloyl dichloride, 5.07 g of isophthaloyl dichloride and 5.311 g of neopentyl glycol were dissolved in 50 g of dehydrated THF, followed by heating for one hour at 60° C. under reduced pressure of several mmHg. To the obtained oily product, 0.01 g of titan tetra-n-butoxide was added, the pressure was reduced to at most 1 mmHg, followed by stirring for one hour at 180° C., and a polymer in a glass state (non-crystalline at room temperature) was obtained. The glass transition temperature of the product was 67° C. by thermal analysis employing a differential scanning calorimeter (hereinafter referred to as DSC). The molecular weight of the product was 18,000 as calculated from the hydroxyl number. Hereinafter the product was referred to as polyester polyol F.

Example 7

Production of an Polyester Polyol

The polymerization was conducted in the same manner as in Example 6 by using 4.06 g of terephthaloyl dichloride, 4.06 g of isophthaloyl dichloride, 1.83 g of dichloride adipate and 5.311 g of neopentyl glycol, to obtain a polymer. The glass transition temperature of the product was 6° C. by thermal analysis employing DSC. The molecular weight of the product was 22,000 as calculated from the hydroxyl number. Hereinafter the product is referred to as polyester polyol G.

Example 8

Composition of an Adhesive Solution

By using the above-mentioned polyester polyol F and G and the following materials, adhesive solutions L to Q having compositions shown in Table 1 were produced.

Silane coupling agent H: 3-glycidoxypropyl trimethoxysilane.

Polyisocyanate I: trimethylol propane-modified trilenediisocyanate.

Polyisocyanate J: trimethylol propane-modified isophorone diisocyanate.

Polyisocyanate K: isocyanurate of hexamethylenediisocyanate.

Solvent: mixed solvent of toluene and ethyl acetate (volume ratio: 1 to 1).

TABLE 1

| Adhesive solution | Composition of adhesive (wt %) | | | | |
|---|---|---|---|---|---|
| | L | M | N | P | Q |
| Polyol F | 18 | 18 | | | |
| Polyol G | | | 18 | 18 | 18 |
| Silane coupling agent H | 1 | 1 | 1 | 1 | 1 |
| Polyisocyanate I | 6 | 4 | 6 | 4 | 4 |
| Polyisocyanate J | | 2 | | 2 | |
| Polyisocyanate K | | | | | 2 |
| Solvent | 75 | 75 | 75 | 75 | 75 |

Example 9

Production of an Comparative Adhesive

Isophorone diisocyanate was dropwise added to a MEK solution having 50 wt % of 1,6-hexanediol at 80° C. under stirring and under reflux, so that the ratio of NCO groups to OH groups was 0.95, followed by stirring and reflux further for 2 hours at 80° C. Then, the mixture was diluted with toluene, and a solution having a solid concentration of about 20 wt % (hereinafter referred to as solution R) was obtained.

Example 10

Evaluation in an Adhesive

A butyl type rubber-containing resin composition having a composition as shown in Table 2 was extrusion-molded at high temperature, to obtain a prism having a base of 12 mm×12 mm and a height of from 5 to 6 cm. A glass plate having a thickness of 6 mm was washed, degreased with MEK, and dried.

Further, to 100 parts by weight of the solution A obtained in Example 1, 1 part by weight of the silane coupling agent H and 10 parts by weight of a butyl acetate solution having 66 wt % of the polyisocyanate J were added, followed by stirring, to produce an adhesive solution A'. The adhesive solution A' was coated on two glass plates followed by air-drying, the operation was repeated twice, to form adhesive layers having the film thickness of about 10 μm after dried.

To the top and the base of the prism of the butyl type rubber-containing resin composition, glass plates having an adhesive coated thereon were contacted, which was then pushed with a pressure of 0.5 kgf/cm$^2$ at 100° C. for 30 minutes to be bond each other, and was left to be cooled, and an H-type test specimen was produced.

The test specimen was left at room temperature for 1 week for curing, and a bonding property test by an H-type test specimen (JIS A5758) was conducted. As a result, the maximum point strength was 6.5 kgf/cm$^2$, the breaking elongation was 400%, and the prism of the butyl type rubber-containing resin composition was broken at the breaking. Further, a similar H-type test specimen was dipped in a hot water of 60° C. for 2 weeks, and the bonding property was examined, whereby low change in bonding properties was observed.

With regard to the butyl type rubber-containing resin composition as shown in Table 2, the partially vulcanized butyl rubber was one having a Mooney viscosity ML (1+3) of 45 at 121° C., the low molecular weight polyisobutylene was one having a viscosity-average molecular weight (Staudinger molecular weight) of 12,000, the high-density polyethylene was one having a melt index of 20, and the tackifier was a hydrogenated cyclopentadiene oligomer (softening point: 105° C.).

TABLE 2

| | Blending amount (wt %) |
|---|---|
| Partially vulcanized butyl rubber | 17. 0 |
| Low molecular weight polyisobutylene | 25.6 |
| High-density polyethylene | 4.2 |
| Tackifier | 10.6 |
| Carbon black | 10.6 |
| Calcium carbonate | 6.4 |
| Hydrous silica | 4.2 |
| Zeolite | 21.3 |

Example 11

Evaluation in an Adhesive

An adhesive solution B' was prepared in the same manner as in Example 10, except that the solution B was used instead of the solution A. An H-type test specimen was prepared by using the adhesive solution B', the bonding properties were evaluated in the same manner, whereby the maximum point strength was 6.5 kgf/cm$^2$, the breaking elongation was 400%, and the prism of the butyl type rubber-containing resin composition was broken at the breaking. Further, after a similar H-type test specimen was dipped in a hot water of 60° C. for 2 weeks, no change in bonding properties was observed.

Example 12

Evaluation in an Adhesive

An adhesive solution C' was prepared in the same manner as in Example 10, except that the solution C was used instead of the solution A. An H-type test specimen was prepared by using the adhesive solution C', the bonding properties were evaluated in the same manner, whereby the maximum point strength was 6.5 kgf/cm$^2$, the breaking elongation was 400%, and the prism of the butyl type rubber-containing resin composition was broken at the breaking. Further, after a similar H-type test specimen was dipped in a hot water of 60° C. for 2 weeks, no change in bonding properties was observed.

Example 13

Evaluation in an Adhesive

An adhesive solution DI was prepared in the same manner as in Example 10, except that the solution D was used instead of the solution A. An H-type test specimen was prepared by using the adhesive solution D', the bonding properties were evaluated in the same manner, whereby the maximum point strength was 6.5 kgf/cm$^2$, the breaking elongation was 400%, and the prism of the butyl type rubber-containing resin composition was broken at the breaking. Further, after a similar H-type test specimen was dipped in a hot water of 60° C. for 2 weeks, no change in bonding properties was observed.

Example 14

Evaluation in an Adhesive

An adhesive solution E' was prepared in the same manner as in Example 10, except that the solution E was used instead of the solution A. An H-type test specimen was prepared by using the adhesive solution E', the bonding properties were evaluated in the same manner, whereby the maximum point strength was 6.5 kgf/cm$^2$, the breaking elongation was 400%, and the prism of the butyl type rubber-containing resin composition was broken at the breaking. Further, after a similar H-type test specimen was dipped in a hot water of 60° C. for 2 weeks, no change in bonding properties was observed.

Example 15

Evaluation in an Adhesive

An H-type test specimen was prepared in the same manner as in Example 10, except that an adhesive L was used instead of the adhesive solution A', and the bonding properties were evaluated in the same manner, whereby the maximum point strength was 6.5 kgf/cm$^2$, the breaking elongation was 400%, and the prism of the butyl type rubber-containing resin composition was broken at the breaking. Further, after a similar H-type test specimen was dipped in a hot water of 60° C. for 2 weeks, no change in bonding properties was observed.

Example 16

Evaluation in an Adhesive

An H-type test specimen was prepared in the same manner as in Example 10, except that an adhesive M was used instead of the adhesive solution A', and the bonding properties were evaluated in the same manner, whereby the maximum point strength was 6.5 kgf/cm$^2$, the breaking elongation was 400%, and the prism of the butyl type rubber-containing resin composition was broken at the breaking. Further, after a similar H-type test specimen was dipped in a hot water of 60° C. for 2 weeks, no change in bonding properties was observed.

Example 17

Evaluation in an Adhesive

An H-type test specimen was prepared in the same manner as in Example 10, except that an adhesive N was used instead of the adhesive solution A', and the bonding properties were evaluated in the same manner, whereby the maximum point strength was 6.5 kgf/cm$^2$, the breaking elongation was 400%, and the prism of the butyl type rubber-containing resin composition was broken at the breaking. Further, after a similar H-type test specimen was dipped in a hot water of 60° C. for 2 weeks, no change in bonding properties was observed.

Example 18

Evaluation in an Adhesive

An H-type test specimen was prepared in the same manner as in Example 10, except that an adhesive P was used instead of the adhesive solution A', and the bonding properties were evaluated in the same manner, whereby the maximum point strength was 6.5 kgf/cm², the breaking elongation was 400%, and the prism of the butyl type rubber-containing resin composition was broken at the breaking. Further, after a similar H-type test specimen was dipped in a hot water of 60° C. for 2 weeks, no change in bonding properties was observed.

Example 19

Evaluation in an Adhesive

An H-type test specimen was prepared in the same manner as in Example 10, except that an adhesive Q was used instead of the adhesive solution A', and the bonding properties were evaluated in the same manner, whereby the maximum point strength was 6.5 kgf/cm², the breaking elongation was 400%, and the prism of the butyl type rubber-containing resin composition was broken at the breaking. Further, after a similar H-type test specimen was dipped in a hot water of 60° C. for 2 weeks, no change in bonding properties was observed.

Example 20

Evaluation in an Adhesive

An adhesive solution AE was prepared in the same manner as in Example 10, except that 100 parts by weight of a mixed solution comprising 50 parts by weight of the solution A and 50 parts by weight of the solution E was used instead of the solution A, and 10 parts by weight of the butyl acetate solution having 66 wt % of the polyisocyanate J was not added thereto. An H-type test specimen was prepared by using the adhesive solution AE, and the bonding properties were evaluated in the same manner, whereby the maximum point strength was 6.5 kgf/cm², the breaking elongation was 400%, and the prism of the butyl type rubber-containing resin composition was broken at the breaking. Further, after a similar H-type test specimen was dipped in a hot water of 60° C. for 2 weeks, no change in bonding properties was observed.

Example 21

Evaluation in an Adhesive

An adhesive solution AE' was prepared in the same manner as in Example 20, except that 100 parts by weight of a mixed solution comprising 30 parts by weight of the solution A and 70 parts by weight of the solution E was used instead of 100 parts by weight of the mixed solution comprising 50 parts by weight of the solution A and 50 parts by weight of the solution E. An H-type test specimen was prepared by using the adhesive solution AE', and the bonding properties were evaluated in the same manner, whereby the maximum point strength was 6.5 kgf/cm², the breaking elongation was 400%, and the prism of the butyl type rubber-containing resin composition was broken at the breaking. Further, after a similar H-type test specimen was dipped in a hot water of 60° C. for 2 weeks, no change in bonding properties was observed.

Example 22

Evaluation in the Comparative Adhesive

An adhesive solution R' was prepared in the same manner as in Example 10, except that the solution R was used instead of the solution A. An H-type test specimen was prepared by using the adhesive solution R', and the bonding properties were evaluated in the same manner, whereby the maximum point strength was 4.0 kgf/cm², the breaking elongation was 32%, and the interfaces between the adhesive and the prism of the butyl type rubber-containing resin composition were broken at the breaking. Further, after a similar H-type test specimen was dipped in a hot water of 60° C. for 2 weeks, no change in bonding properties was observed.

Examples 23 to 36

Evaluation in Durability of Double Glazing

By using the above-mentioned adhesive solutions A' to E', L to Q, R, AE and AE', double glazings having a structure shown in FIG. 2 were produced to examine the performance of the adhesives. The adhesive solution was coated on the periphery surface of two clean glass plates 1a and 1b, followed by air-drying, the glass plates were arranged so that the surfaces having the adhesive solution coated thereon faced each other. The butyl type rubber-containing resin composition having a composition shown in Table 2 was extrusion-molded at high temperature on the surfaces having the adhesive solution coated thereon of the glass plates, to form a spacer 20, and the molded spacer and the glass plates were bonded by the adhesive.

A durability test based on JIS R3209 was conducted on the obtained double glazing 10. The results are shown in Tables 3 and 4. The same test was conducted on a double glazing obtained in the same manner, except that the adhesive was not used, for comparison. 6 double glazing test specimens were examined for each durability test, and the values in Tables 3 and 4 represent the highest temperatures (° C.) among the dew points in the air layer of the respective test specimens.

JIS A hardness (HsA) of the product of the butyl type rubber-containing resin composition was 60 at 25° C., and coefficient of water vapor permeation by JIS K7149 was $1 \times 10^{-9}$ (cm³·cm/(cm²·sec·cmHg)).

TABLE 3

|  | 23 | 24 | 25 | 26 | 27 | 28 | 29 |
|---|---|---|---|---|---|---|---|
| Adhesive solution | A' | B' | C' | D' | E' | L | M |
| Initial dew point | <-60 | <-60 | <-60 | <-60 | <-60 | <-60 | <-60 |
| After group I | <-60 | <-60 | <-60 | <-60 | <-60 | <-60 | <-60 |
| After group II | <-60 | <-60 | <-60 | <-60 | <-60 | <-60 | <-60 |
| After group III | <-60 | <-60 | <-60 | <-60 | <-60 | <-60 | <-60 |
| JIS III group judgement | Passing | Passing | Passing | Passing | Passing | Passing | Passing |

TABLE 4

|  | 30 | 31 | 32 | 33 | 34 | 35 | 36 |
|---|---|---|---|---|---|---|---|
| Adhesive solution | N | P | Q | AE | AE' | R' | None |
| Initial dew point | <-60 | <-60 | <-60 | <-60 | <-60 | <-60 | <-60 |

TABLE 4-continued

|  | 30 | 31 | 32 | 33 | 34 | 35 | 36 |
|---|---|---|---|---|---|---|---|
| After group I | <-60 | <-60 | <-60 | <-60 | <-60 | <-60 | +5 |
| After group II | <-60 | <-60 | <-60 | <-60 | <-60 | -18 | Stop |
| After group III | <-60 | <-60 | <-60 | <-60 | <-60 | Stop |  |
| JIS III group judgement | Passing | Passing | Passing | Passing | Passing | Failure | Failure |

As shown in Examples 23 to 34, in a case where the adhesives of the present invention were used, an increase in the dew point was not observed at the completion of the evaluation in durability by JIS group III, and they were judged to be passed. On the other hand, in both the case of using the adhesive which was not the adhesive of the present invention (Example 35), and the case of not using an adhesive (Example 36), peeling at the interfaces between the glass plates and the spacer was observed by the completion of the evaluation in durability by JIS group III, and the dew point of air in the air layer increased. Namely, neither of them passed the above-mentioned durability test.

INDUSTRIAL APPLICABILITY

The adhesive of the present invention is good in durability in bonding a glass plate and a butyl type rubber-containing resin composition. It is an adhesive suitable for bonding a glass plate and a spacer comprising a butyl type rubber-containing resin composition, for producing a double glazing which employs a glass plate and a spacer comprising a butyl type rubber-containing resin composition.

What is claimed is:

1. A method for bonding inorganic glass and a resin composition containing a butyl rubber to each other, which method comprises, bonding with an adhesive comprising as an effective component, at least one member selected from the group consisting of (A) a mixture of a terminal reactive oligomer having $C_4$ bivalent hydrocarbon groups as repeating units with a chain extender, (B) a reaction product of a terminal reactive oligomer having $C_4$ bivalent hydrocarbon groups as repeating units with a chain extender, (C) a mixture of a polyester polyol with a polyisocyanate and (D) a reaction product of a polyester polyol with a polyisocyanate, wherein said butyl rubber is not in direct contact with said inorganic glass.

2. The product obtained by the method of claim 1.

3. The method according to claim 1, wherein the chain extender is a polyisocyanate, a polycarboxylic acid or a reactive acid derivative of a polycarboxylic acid.

4. The product obtained by the method of claim 3.

5. The method according to claim 1, wherein the terminal reactive oligomer having $C_4$ bivalent hydrocarbon groups as repeating units is a hydroxyl group-terminated oligomer or a carboxyl group-terminated oligomer.

6. The product obtained by the method of claim 5.

7. The method according to claim 1, wherein the reaction product of a terminal reactive oligomer having $C_4$ bivalent hydrocarbon groups as repeating units with a chain extender, is a polyurethane polymer or an isocyanate group-terminated prepolymer, which is a reaction product of a hydroxyl group-terminated oligomer with a polyisocyanate.

8. The product obtained by the method of claim 7.

9. The method according to claim 1, wherein the reaction product of a terminal reactive oligomer having $C_4$ bivalent hydrocarbon groups as repeating units with a chain extender, is a polyester polymer which is a reaction product of a hydroxyl group-terminated oligomer with a polycarboxylic acid or a reactive acid derivative of a polycarboxylic acid.

10. The product obtained by the method of claim 9.

11. The method according to claim 1, wherein the polyester polyol is a solid polyester polyol at room temperature.

12. The product obtained by the method of claim 11.

13. The method according to claim 1, wherein the polyester polyol is a polyester polyol having residues of an aromatic dicarboxylic acid having hydroxyl groups in the carboxylic groups removed therefrom.

14. The product obtained by the method of claim 13.

15. The method according to any one of claims 1 to 13, which further contains a silane coupling agent.

16. The product obtained by the method of claim 15.

17. The method according to claim 1, wherein the adhesive comprises component (A).

18. The product obtained by the method of claim 17.

19. The method according to claim 1, wherein the adhesive comprises component (B).

20. The product obtained by the method of claim 19.

21. The method according to claim 1, wherein the adhesive comprises component (C).

22. The product obtained by the method of claim 21.

23. The method according to claim 1, wherein the adhesive comprises component (D).

24. The product obtained by the method of claim 23.

25. The method for bonding inorganic glass and a resin composition containing a butyl rubber to each other, which method comprises, bonding with an adhesive comprising as an effective component, at least one member selected from the group consisting of (A) a mixture of a terminal reactive oligomer having $C_4$ bivalent hydrocarbon groups as repeating units with a chain extender, (B) a reaction product of a terminal reactive oligomer having $C_4$ bivalent hydrocarbon groups as repeating units with a chain extender, (C) a mixture of a polyester polyol with a polyisocyanate and (D) a reaction product of a polyester polyol with a polyisocyanate, wherein the resin composition containing a butyl rubber is a resin composition containing a butyl rubber and a crystalline polyolefin with a proportion of the crystalline polyolefin from 2 to 50 wt % to the total of the butyl rubber and the crystalline polyolefin.

26. The product obtained by the method of claim 25.

* * * * *